Patented June 20, 1944

2,351,937

UNITED STATES PATENT OFFICE 2,351,937

PROCESS FOR THE MANUFACTURE OF RESITES

Emil Dreher, Ludwigshafen-on-the-Rhine, Germany; vested in the Alien Property Custodian No Drawing. Application May 17, 1939, Serial No. 274,109. In Germany October 9, 1937

2 Claims. (Cl. 260—19)

The present invention relates to new kinds of insoluble and infusible phenol-aldehyde resins of the type of resites, and a process for their manufacture.

It has already been proposed to condense phenols with aldehydes in the presence of alkaline condensation agents until the aldehyde has combined, and to mix the intermediate product thus obtained with fatty acids or acids with low electrolytic dissociation constants. Insofar as insoluble and infusible condensation products (resites) are to be produced thereby, these acids are however employed in excess.

It is known that alkali-condensed resols can only with difficulty be hardened to insoluble and infusible compact articles such as blocks, bars, tubes, plates, etc., since cracks and blisters form and the hardened product is only with difficulty removable from the mould. In addition, the cast resins show only an insufficient strength and homogeneity, so that they are not serviceable for technical purposes.

The process according to the present invention now renders it possible, in a surprising manner, to harden alkali-condensed resols, prepared from phenols and aldehydes, into cast resins characterized by extraordinarily good mechanical strength, especially high chemical resistance to organic solvents and acids, in particular inorganic acids, and to water and steam. In addition, the products are practically free from shrinkage, all of which is not the case with cast resins hitherto prepared.

In accordance with the present invention, the phenols and aldehydes, used in a molar ratio such that 1 mol. of phenol is mixed with not less than 1 mol. of aldehyde and preferably 1.25 mol. of aldehyde, are treated in known manner with alkaline condensation agents and, after easily soluble resols have been formed or the aldehyde employed has been combined, admixed with high-molecular organic fatty acids or resin acids, but only in an amount which is insufficient for complete neutralization of the alkaline condensation agents used, whereupon the hardening is effected and the final product is formed in an alkaline condition, since no acid reaction should set in during the reaction. It is preferred to neutralize about 70 to 98 per cent of the alkaline condensation agents employed. If desired, the condensation may be carried out under reduced pressure, in order to remove volatile ingredients or air from the resin. The now dehydrated condensation products are further condensed in moulds, until the no longer varying condition of resite is attained.

Besides ordinary phenol, which is preferably employed, cresols, particularly metacresol, xylenols, particularly metaxylenol, cresol mixtures containing metacresol and/or metaxylenol, or mixtures containing several or all of the above mentioned phenols, resorcinol or the like, are also suitable for the process according to the present invention.

Of the aldehydes, formaldehyde or its polymers, such as paraformaldehyde, trioxymethylene, or compounds splitting off formaldehyde, are especially preferred. Other aldehydes, such as acetaldehyde, furfuraldehyde, or mixtures of various aldehydes, may also be employed.

Caustic potash solution is suitable for the alkaline condensation. Caustic soda solution, ammonia, alkali and alkaline-earth hydroxides, quaternary ammonium bases, aromatic and aliphatic amines containing at least two carbon atoms, etc., may however also be employed in the condensation. All alkaline condensation agents are suitable, which, with the organic fatty acids or resin acids employed, are ultimately capable of forming salts which are gel-soluble in the resins and have an emulsifying action.

Of the organic high-molecular fatty acids or resin acids which may be employed, there may for example be mentioned oleic acid, palmitic acid, stearic acid, ricinoleic acid, linseed oil fatty acid, train oil fatty acid, abietic acid, copal resin acid, tall oil acid, coconut oil fatty acid, palm kernel oil fatty acid, wool grease fatty acid. These may be referred to generically as high-molecular, organic, soap-forming acids. It is preferable to use those fatty acids which contain more than 12 carbon atoms in the molecule and which are capable of forming, with the bases used for condensation, salts which are gel-soluble in the resins and have an emulsifying action.

For the condensation and hardening, the usual temperatures are employed. The duration of heating varies according to the amount of condensation agent employed, and depends on the molar ratio of phenol to aledhyde employed and also on the operating temperature.

The cast resin resites prepared by the process according to the present invention are characterized by an extraordinarily high power of resistance to chemical action, and are stable to moisture, water and steam, and also to organic solvents, acids, even concentrated mineral acids, fatty acids and the like. Products prepared according to the invention were treated with concentrated sulphuric acid, concentrated hydrochloric acid, concentrated phosphoric acid, concentrated formic acid, or with aqua regia, for 50 hours at 90° C. without their being attacked or altered. Hitherto known phenol-aldehyde resins, after such treatment, were either completely destroyed or were extremely strongly attacked.

The products obtained according to the present invention do not become cracked, and they exhibit an extraordinarily high strength. Thus the impact bending strength amounts to 26 to 28 cm. kg./cm.² This strength was measured on a standard bar and is 2 to 4 times as great as that of condensation products hardened in an alkaline state to the end without addition of fatty acids. (Details of the method of determining strengths is to be found in Vorschriftenbuch des Vereins Deutscher Elektrotechniker, 1933, p. 401.) The bending strength of the new products shows a value of about 1420 cm. kg./cm.², whilst hitherto known products show a value of only 450 to 900 cm. kg./cm.² The heat resistance, measured according to Martens (for details of this method see Vorschriftenbuch des Vereins Deutscher Elektrotechniker, 1933, p. 404), amounts to 120 to 130° C., as compared with a heat resistance of 45 to 100° C. for known products. The notch impact strength, which gives a measure of the brittleness of artificial materials (details are to be found in the article by Nitsche and Zebrowski in the periodical "Plastiche Massen," 1937), is 1.7 to 1.9 kg./cm.², whilst artificial resins condensed in an alkaline state to the end without addition of fatty acids show only values below 1. The ball test hardness is 1350 kg./cm.², as against 600 to 1000 kg./cm.² for known materials.

The stability of volume of the new resins is noteworthy, i. e., they are practically free from shrinkage. In addition, they may be worked mechanically in the usual manner and quite as easily as are the hitherto known artificial resins of the cast resin type.

Owing to the above mentioned properties the products manufactured according to the present invention are suitable for a great variety of technical applications, particularly as substitutes for metals, for the manufacture of bearings, and for all purposes for which a material resistant to chemical action is required, for example, for the construction of acid pumps, acid containers, chemical apparatus, and the like.

The process according to the present invention will be further illustrated by the following examples, but it is to be understood that the invention is not to be restricted to the initial materials and working conditions employed in these examples.

Example 1

1000 grams of phenol and 1250 grams of 33 per cent formaldehyde are condensed with 100 cc. of 5N-caustic potash solution, until the whole of the formaldehyde has combined. When using a temperature of 80° C., this will be the case after about 1 to 2 hours. A slightly reduced pressure of about 500 mm. of mercury is maintained in the reaction vessel. The water is then removed by distillation in vacuo, and the intermediate product obtained is admixed with 138 grams of oleic acid. The product, after being concentrated to a viscous condition, is then hardened in moulds in the manner customary in the manufacture of cast resins, at a temperature of about 100° C.

Example 2

1000 grams of phenol and 1000 grams of 33 per cent formaldehyde are condensed with 100 cc. of 5N-caustic potash solution, as described in Example 1. After removal of the water, 135 grams of ricinoleic acid are added, whereupon the mixture is further treated as in Example 1.

I claim:

1. A process for producing insoluble, infusible cast resin products which comprises condensing a phenol with formaldehyde, in the proportion of approximately 1 mol of phenol to 1.25 mols of formaldehyde in the presence of an alkaline catalyst until all of the formaldehyde has combined with the phenol, removing water by distillation under vacuum, neutralizing from 70 to 98% of the alakline catalyst with an organic soap forming acid having at least 12 carbon atoms, concentrating the resultant product to a viscous condition, pouring the viscous product into a mold and finally hardening the product in the mold at approximately 100° C.

2. A process for producing insoluble, infusible cast resin products which comprises condensing phenol and formaldehyde in the proportion of 1000 grams of phenol to 1250 grams of 33% formaldehyde in the presence of caustic potash solution in the proportion of 100 cc. of 5 normal caustic potash at a temperature approximately 80° C. for about 1 to 2 hours removing water by distillation under vacuum, neutralizing the caustic by adding oleic acid in the proportion of 138 grams, concentrating the resultant product to a viscous condition, pouring the viscous product into a mold and finally hardening the product in the mold at a temperature of about 100° C.

EMIL DREHER.